(No Model.)
W. A. BENNETT.
HORSE COLLAR.
No. 437,278. Patented Sept. 30, 1890.
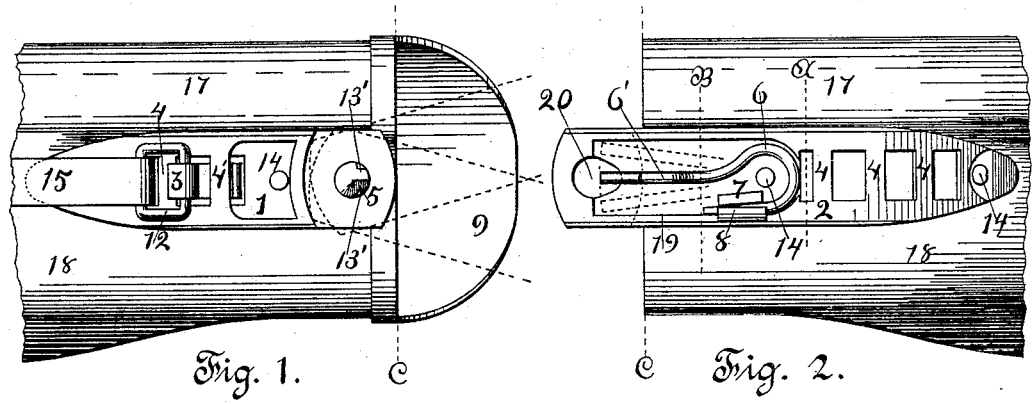
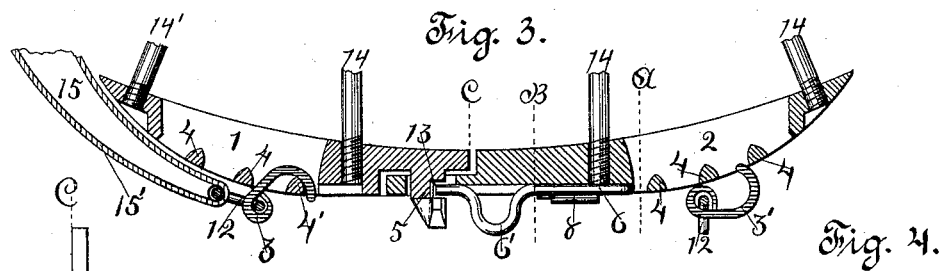
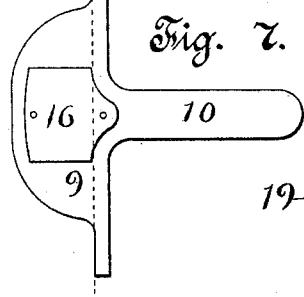
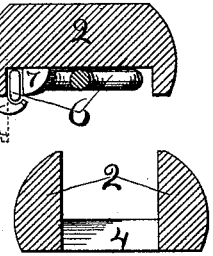
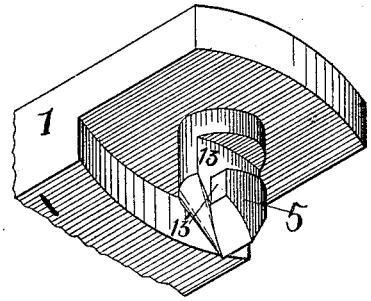
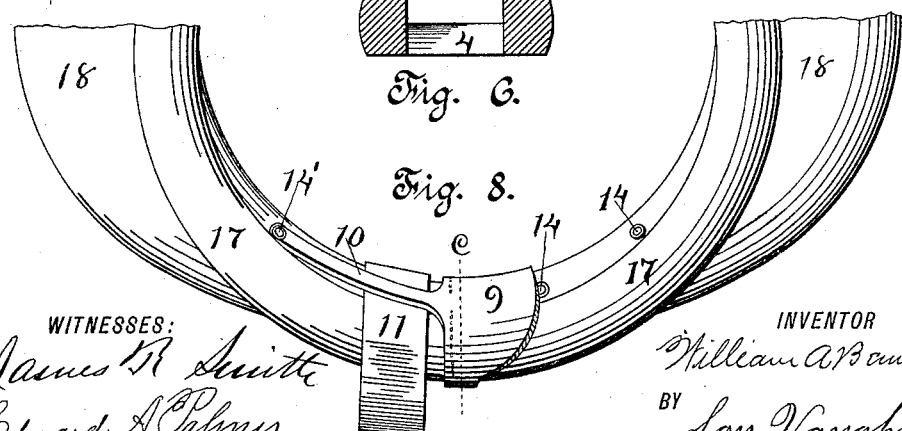
WITNESSES:
James R. Smith
Edward A. Palmer
INVENTOR
William A. Bennett
BY Lon Vaughan.
his ATTORNEY

UNITED STATES PATENT OFFICE

WILLIAM A. BENNETT, OF BLAIR, NEBRASKA.

HORSE-COLLAR.

SPECIFICATION forming part of Letters Patent No. 437,278, dated September 30, 1890.

Application filed January 30, 1890. Serial No. 338,607. (No model.)

*To all whom it may concern:*

Be it known that I, WILLIAM A. BENNETT, a citizen of the United States, residing at Blair, in the county of Washington and State of Nebraska, have invented new and useful Improvements in Horse-Collars, of which the following is a specification.

My invention relates to improvements in horse-collars made separable at the lower end or throat to facilitate applying the collar around the animal's neck; and the objects of my improvements are, first, to provide a secure fastening that will be flexible, thus relieving the fastener from undue strain caused by the action of the animal's shoulders against the belly of the collar during draft and allowing the different halves of the collar to always fit perfectly and comfortably to the shoulders; second, to combine with a collar-fastener an adjustable length hame-fastener for the lower ends of the hames, and thus avoid the use of the ordinary hame-strap or other independent hame-fastener; third, to provide an adjustable hame-fastener of this class that will not be released by unlocking the collar-fastener—that is, that will not let the hames loose from the halves of the collar when they are opened at the throat; fourth, to provide the fastener with an automatic locking contrivance; fifth, to provide an easy and simple means of unlocking the fastener; sixth, to provide means for retaining the martingale-strap while the halves of the collar are separated, and, seventh, to provide, in connection with these, a throat-protector that will not become wrinkled, but retain its proper form, covering the junction of the lower ends of the halves of the collar at the throat. I attain these objects by the mechanism illustrated in the accompanying drawings, in which—

Figures 1 and 2 are bottom views of the two principal parts of the fastener 1 and 2 attached at the lower end or throat to the opposite halves of a separable collar. Figs. 1 and 3 show the lower end of a hame 15 hooked to the part 1 by the hook 3. Fig. 3 is a longitudinal section of the parts 1 and 2 locked together. Fig. 4 is a perspective view of the joint end of part 1, showing the stud 5. Fig. 5 is a cross-section on the broken line B through part 2 in Figs. 2 and 3. Fig. 6 is a cross-section on the broken line A. Fig. 7 shows the form of the throat-protector, the manner of re-enforcing the same, and the extension 10 forming the martingale-loop; and Fig. 8 is a perspective view of the lower end of a horse-collar, showing the throat-protector 9 with its extension 10, forming a martingale-loop, and the washers and screw-heads of the bolts 14 14 14 and 14', by which the fastening parts 1 and 2 are attached to the halves of the collar.

Similar figures refer to similar parts throughout the several views.

In Figs. 1, 2, and 8, 17 denotes the rim, and 18 the belly, of the collar. At the lower end of the collar on its exterior periphery in the circular groove between the belly and the rim the two principal parts of the fastener 1 and 2 are firmly attached by the screw-bolts 14 14 14 and 14' or by other suitable means, thus holding together separably the two halves of the collar at their junction. (Indicated by the broken line C.) The broken line C in Figs. 1, 2, 3, 7, and 8 indicates the place of separation or joint between the two halves of the collar.

Figs. 5 and 6 show the rounded form of 1 and 2 to fit between the belly and the rim, while in Fig. 3 is shown the longitudinal curvature necessary to fit the periphery of the lower end of the collar. It will also be noticed by these sections that the necessary form has been given to each of the parts 1 and 2 to enable the same to be cast without the use of cores. Part 1 is attached to the lower end of the half of the collar, to which is also attached the throat-protector and martingale-loop. The joint ends of parts 1 and 2 are halved together by removing half the thickness from the lower side of a portion at the joint end of part 1 and leaving a corresponding projection on the end of part 2, both ends and shoulders being formed circular, as shown in Figs. 1, 2, and 4. From the center of this reduced portion of part 1 a cylindrical stud 5 projects downward and loosely through a corresponding aperture 20 in the center of the projecting and lapping portion of part 2.

The lower face of part 2 has a recess large enough to contain the wire C-spring 6, which is secured to the part by inserting its flattened end between the rib 19 and the lug 7, then closing down the cold-shut 8 over the flattened end, the opposite or free end of the C-spring 6 serving as an elastic latch to lock the stud 5 in position when the parts 1 and 2 are coupled together. The spring and latch are integral. By placing this spring-latch 6 in a recess I decrease the chances of its being broken or unintentionally flexed, the recess also reducing the weight of the part where it will not greatly weaken it. The spring-latch 6 is formed by bending in the manner shown in Fig. 2, its free end extended part way under the aperture 20 and into the rectangular groove 13, which is cut at right angles to the axis of the cylindrical stud 5 and across that side toward the spring-latch, allowing the free end of the spring-latch to be flexed or vibrated backward or forward through the groove to the positions indicated by the broken lines in Fig. 2, and thus release the stud, so that it may be withdrawn.

That portion of the end of the stud which is directly below the groove 13 is made cuneiform, or wedge-shaped, with either a single or double inclined plane, the lower wall of the groove 13 being the base of the wedge, so that when the corresponding ends of parts 1 and 2 are brought in contact and the stud 5 is thrust through the aperture 20 the wedge-shaped end will automatically flex the spring-latch, whose elasticity will return its free end to a central position in the groove 13, thus locking the parts securely together. (See Fig. 3.) The remaining portion of the end of the stud which extends below the part 2 is made conical to facilitate inserting the stud in the aperture 20. Thus the point or end of the stud 5 which projects below part 2 is semi-cuniform and semi-conical.

In Fig. 2 it will be seen that the aperture 20 is elongated on the side occupied by the groove 13 and the perpendicular face of the wedge-shaped portion of the stud and toward the spring-latch. This enlargement obviates any catching of the point of the stud in coupling the parts together, and also prevents any obstruction caused by accumulations of dirt or ice.

The spring-latch 6 between its fixed and free ends is bent to form the downwardly-projecting loop 6', by which with the thumb or fingers the spring-latch may be flexed either forward or backward to unlock the fastener. The flexion of the fastener at its joint is indicated by the broken lines in Fig. 1, showing the relative positions that may be given part 2.

Figs. 1 and 4 show the curvature given to the bottom of the groove 13 in the stud 5, so that the ends of the bottom of the groove will not obstruct the action of the spring-latch when the parts 1 and 2 are flexed at the joint. Figs. 1 and 4 also show the indentations 13' on each side of the base of the wedge-shaped portion of the stud 5, which indentations are directly below each end of the groove 13, and through one of which the free end of the spring-latch must always pass in coupling the parts 1 and 2 together. By these indentations I remove the sharp angles at the base of the wedge and give the free end of the spring-latch a smooth surface to slide over in making the coupling. Otherwise these angles would cut together with the sharp corners on the end of the latch, working hard and destroying both.

I do not wish to be limited in my patent to the particular manner set forth above for fastening the end of the spring-latch 6, for I have selected this from the several different manners in which it may be done with equal results.

Parts 1 and 2 between their joint ends and their extreme ends are each divided longitudinally into two side bars connected at their lower face by the smaller cross-bars 4 4 4', &c., which receive the hook 3, attached to the rectangular link 12, in the lower end of the hame 15. This hook 3, I propose to make of malleable iron and cold-shut one end of it into the link 12, the hook being formed by bending the other end outwardly away from the collar, giving the form shown in Fig. 3, or by constructing the metallic re-enforcing strips 15' with integral hooks similar to hook 3 and omitting the links 12.

It will be seen that by having the hook 12 bent outward it necessitates unbuckling the hames at the top of the collar in order to swing the hook down to the position shown at 3' in Fig. 3, in which position it may be unhooked from or hooked on to any of the cross-bars 4 4, &c.

The throat-protector 9, which I propose to make of leather, is stitched or otherwise fastened to one-half of the collar, as shown in Figs. 1 and 8, and to prevent the same from becoming wrinkled or crimped by the action of the collar at its place of separation C, or from other causes, I propose to re-enforce it with a thin metallic plate 16, as shown in Fig. 7.

The extension 10 forming the martingale-loop is carried along the inner periphery of the collar and its end fastened by passing through it the screw-bolt 14'. The loop may be independent of the throat-protector, having its lower end fastened by the screw-bolt 14 in the same half of the collar, or both ends may be attached by stitching to the collar. The martingale-strap 11 is inserted between the collar and the loop 10, the loop retaining the strap when the halves of the collar are separated.

I am aware that prior to my invention horse-collars have been made with separable throats and combined with coupling devices. I therefore do not claim such a combination, broadly; but What I do claim as my invention, and desire to secure by Letters Patent, is—

1. The combined throat-protector and martingale-retainer consisting of the leather plate 9, having the integral extension 10 as an attachment to one of the halves of a separable-throat horse-collar, substantially as shown and described.

2. In a separable-throat horse-collar, the combination, with the halves thereof, of the martingale-retainer 10, the collar-fastener consisting of part 1, having the stud 5, with the groove 13, part 2, having the aperture 20, and the spring-latch 6, a portion of which near its fixed end is bent to form an integral C-spring, substantially as shown and described.

3. The combined throat-protector and martingale-retainer consisting of the leather plate 9, having the metallic re-enforcing plate 16 and the narrow integral extension 10 as an attachment to one of the halves of a separable-throat horse-collar, substantially as shown and described.

4. In a separable-throat horse-collar, the combination, with the halves thereof, of the combined throat-protector and martingale-retainer consisting of the leather plate 9, with its re-enforcing plate 16 and narrow integral extension 10, the collar-fastener consisting of part 1, having the stud 5, with the groove 13, part 2, having the aperture 20, and the spring-latch 6, with a portion near its fixed end bent to form an integral C-spring, substantially as shown and described.

5. In a flexible-joint collar-fastener, the combination of parts 1 and 2, halved together by reducing the thickness of the lapping portions and curving the shoulders and ends of the parts, as shown, part 1 having the cylindrical stud 5, with the rectangular groove 13, the stud projecting from the center of the reduced portion at the joint end, part 2 having a circular aperture 20 through its reduced portion, adapted to loosely receive the stud 5, also attached to the lower face of part 2, and a spring-latch 6, the free end set to occupy a central position in the groove 13 and flex backward or forward through the same, substantially as shown and described.

6. In a collar-fastener, part 1, having the stud 5, with the groove 13, the stud having a semi-cunciform and semi-conical point, in combination with part 2, having the aperture 20, elongated on its side occupied by the perpendicular face of the wedge-shaped portion of the stud and toward the spring-latch, substantially as shown and described.

7. In a combined collar and adjustable hame-fastener, a collar-fastener consisting of two parts separately jointed together, a part attached to each of the halves of a separable collar, each part divided longitudinally between its joint and extreme ends into two side bars connected by two or more cross-bars, in combination with a pair of hames provided with hooks at their ends adapted to engage said cross-bars, substantially as described.

8. In a combined collar and adjustable hame-fastener, a collar-fastener consisting of two parts separably jointed together, a part attached to each of the halves of a separable collar, each part between its joint and extreme ends divided longitudinally into two side bars connected by two or more cross-bars, in combination with a pair of hames provided with the outwardly-bent hooks 3 and 3', attached to the links 12 at the ends of the hames, said hooks adapted to engage said cross-bars, substantially as shown and described.

9. In a combined flexible-joint collar-fastener and adjustable hame-fastener, part 1, having the stud 5, with the groove 13, and part 2, having the aperture 20, and the spring-latch 6, the parts 1 and 2 attached to the halves of a separable collar, each part between its joint end and extreme end divided longitudinally into two side bars connected by two or more cross-bars, in combination with a pair of hames provided at their ends with hooks adapted to engage the cross-bars, substantially as shown and described.

10. In a separable throat-collar, the combination, with the halves thereof, of the throat-protector 9, with its extension 10 and re-enforcing plate 16, the collar and hame fastener consisting of part 1, having the stud 5, with the groove 13, and the cross-bars 4, 4, and 4', part 2, having the aperture 20, the spring-latch 6, and the cross-bars 4 4 4', and the hames 15, with the links 12, carrying the hooks 3, all substantially as shown and described.

WILLIAM A. BENNETT.

Witnesses:
   THEO. HALLER,
   E. CASTETTER.

It is hereby certified that in Letters Patent No. 437,278, granted September 30, 1890, upon the application of William A. Bennett, of Blair, Nebraska, for an improvement in "Horse-Collars," an error appears in the printed specification requiring correction, as follows: In line 52, page 3, the word "separately" should read *separably;* and that the Letters Patent should be read with this correction therein to make it conform to the record of the case in the Patent Office.

Signed, countersigned, and sealed this 18th day of November, A. D. 1889.

[SEAL.]
              CYRUS BUSSEY,
             *Assistant Secretary of the Interior.*

Countersigned:
 C. E. MITCHELL,
  *Commissioner of Patents.*